United States Patent
R et al.

(10) Patent No.: US 11,834,050 B2
(45) Date of Patent: Dec. 5, 2023

(54) SYSTEM AND METHOD FOR PREDICTIVE PRE-WARMING CONTROL OF HYBRID ELECTRIC VEHICLES (HEV)

(71) Applicant: Hitachi Astemo, Ltd., Hitachinaka (JP)

(72) Inventors: Ragesh R, Bangalore (IN); Shin Yamauchi, Bangalore (IN); Kengo Kumano, Tokyo (JP); Kazuhiro Oryoji, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 256 days.

(21) Appl. No.: 17/426,207

(22) PCT Filed: Feb. 27, 2020

(86) PCT No.: PCT/JP2020/008138
§ 371 (c)(1),
(2) Date: Jul. 28, 2021

(87) PCT Pub. No.: WO2020/175641
PCT Pub. Date: Sep. 3, 2020

(65) Prior Publication Data
US 2022/0097712 A1 Mar. 31, 2022

(30) Foreign Application Priority Data
Feb. 28, 2019 (IN) .............................. 201941007781

(51) Int. Cl.
*B60W 30/194* (2012.01)
*B60W 20/16* (2016.01)
(Continued)

(52) U.S. Cl.
CPC .......... *B60W 30/194* (2013.01); *B60W 20/16* (2016.01); *F02N 11/0848* (2013.01);
(Continued)

(58) Field of Classification Search
CPC .............. B60W 30/194; B60W 20/16; B60W 2510/0676; B60W 2510/244;
(Continued)

(56) References Cited

U.S. PATENT DOCUMENTS

| 10,112,597 B2 * | 10/2018 | Belt ...................... B60W 10/06 |
| 2010/0185349 A1 | 7/2010 | Harada et al. |
| 2014/0114523 A1 * | 4/2014 | Hirasawa .............. B60W 20/40 903/930 |

FOREIGN PATENT DOCUMENTS

| JP | 2005160252 A * | 6/2005 |
| JP | 2010-138868 A | 6/2010 |

(Continued)

OTHER PUBLICATIONS

International Search Report (PCT/ISA/210) issued in PCT Application No. PCT/JP2020/008138 dated Jun. 2, 2020 (two (2) pages).

(Continued)

*Primary Examiner* — Isaac G Smith
(74) *Attorney, Agent, or Firm* — Crowell & Moring LLP

(57) ABSTRACT

The present disclosure relates to a method and a control unit for controlling pre-warming process of an engine of a Hybrid Electric Vehicle (HEV). The method comprises determining start-up time of the engine. The method also comprises determining engine heating time for the engine. The pre-warming process of the engine is initiated prior to start up time of the engine. The process of pre-warming is discontinued when the determined start-up time of the engine is greater than the engine heating time and the process is restarted when the determined start-up time of the engine is less than the engine heating time and when the pre-warming process of the engine is discontinued. The above-mentioned process is reiterated at plurality of time intervals for controlling the pre-warming process of the (Continued)

engine which results in energy efficiency and sufficient heat for warm-up of the engine.

20 Claims, 11 Drawing Sheets

(51) Int. Cl.
*F02N 11/08* (2006.01)
*F02N 19/02* (2010.01)
(52) U.S. Cl.
CPC ..... *F02N 19/02* (2013.01); *B60W 2510/0676* (2013.01); *B60W 2510/244* (2013.01); *B60W 2510/246* (2013.01); *B60W 2510/305* (2013.01); *B60W 2520/10* (2013.01); *F02N 2200/023* (2013.01); *F02N 2200/061* (2013.01); *F02N 2200/0801* (2013.01)
(58) Field of Classification Search
CPC ..... B60W 2510/246; B60W 2510/305; B60W 2520/10; F02N 11/0848; F02N 19/02; F02N 2200/023; F02N 2200/061; F02N 2200/0801

USPC .......................................................... 701/22
See application file for complete search history.

(56) References Cited

FOREIGN PATENT DOCUMENTS

| JP | 2013-159176 A | 8/2013 | | |
|---|---|---|---|---|
| JP | 2013-160058 A | 8/2013 | | |
| JP | 2013160058 A | * | 8/2013 | ......... B60H 1/00314 |
| WO | WO-2013098928 A1 | * | 7/2013 | ............... B60K 1/04 |
| WO | WO 2013/114843 A1 | 8/2013 | | |

OTHER PUBLICATIONS

Written Opinion (PCT/ISA/237) issued in PCT Application No. PCT/JP2020/008138 dated Jun. 2, 2020 (four (4) pages).

* cited by examiner

SYSTEM AND METHOD FOR PREDICTIVE PRE-WARMING CONTROL OF HYBRID ELECTRIC VEHICLES (HEV)

TECHNICAL FIELD

The present subject matter generally relates to Hybrid Electric Vehicles (HEV). More particularly, but not exclusively, the present disclosure discloses a method and a control unit for controlling pre-warming process of an engine of the HEV.

BACKGROUND ART

The warm-up control of engine cylinder is essential to improve fuel efficiency and to reduce exhaust emissions in both conventional and Hybrid Electric Vehicles (HEVs). This is because as the coolant is warm, engine thermal efficiency increases due to lower exhaust heat loss. In conventional vehicles, such an objective i.e. improving fuel efficiency and reducing exhaust emissions is achieved by reducing the engine warm-up time by reducing/stopping coolant flow through the engine. In HEVs, the above objective is achieved by controlling engine coolant flow using thermostat/electric valve. At present, controlling of the engine coolant flow to achieve the above objective is a one-time process and hence does not efficiently aid in improving energy efficiency in the HEVs.

Some of the conventional methods propose to use a three-way valve to connect the High Voltage (HV) and engine cooling circuits for enhancing warm up of the engine and in turn to enhance the energy efficiency. The control method predicts start time of the engine based on State of Charge (SOC) of a power source of the HEV. Based on the start time of the engine, the pre-warming process is initiated. To decide the start time of pre-warming process, conventional technique proposes to use the comparison between "pre-warm up time of engine (twu)" and "time taken until engine start up (t-soc)". The twu is calculated based on the desired coolant temperature, coolant flow rate, energy input and ambient temperature. The t-soc is calculated based on the slope of the SOC curve. From the SOC curve, the slope of SOC is calculated and based on this slope, current SOC and lower threshold of SOC for engine start and the time taken until engine start up is found.

The prediction of start time of pre-warming-up process based on single SOC slope is erroneous. The conventional technique considers both negative and positive slopes. The negative slope corresponds to SOC fall due to battery discharge and positive slope corresponds to battery charging due to regenerative braking as the event occurs in future. Further, the conventional technique does not control warm-up process once the warm-up process is started. Hence results in wastage of energy.

FIG. 1 shows a graph 100 illustrating the process of pre-warming in the conventional technique. As shown in FIG. 1, the X-axis represents time and the Y-axis represents SOC of a power source of the engine of the HEV. Based on the SOC of the power source, the curves are plotted. Based on SOC slope identified from the graph, the start time or "Engine On" time is predicted. As an example, in case 1, the predicted "Engine On" time based on single SOC slope may be at the time instant 200 represented by curve 1 and the actual start time of the engine may be at the time instant 250 represented by the curve 2. In this scenario, the predicted "Engine On" time is earlier than the actual start time of the engine. Due to this, the pre-warming process starts early, may be at the time instant 120 and continues till the engine is On which results in wastage of energy. In case 2, the predicted "Engine On" time based on single SOC slope may be at the time instant 300 represented by curve 3. In this scenario, the engine start time is later than the actual start time of the engine. Due to this, the pre-warming process starts late, may be at the time instant 220 and continues till the engine is On which results in insufficient heat for warm-up. This is due to the error in predicting the start time of the engine which is based on single SOC slope. Further, it can also be noted that the check for pre-heating is stopped just after the start of pre-heating process and hence there is no control of the pre-warming process of the engine.

The information disclosed in this background of the disclosure section is only for enhancement of understanding of the general background of the invention and should not be taken as an acknowledgement or any form of suggestion that this information forms the prior art already known to a person skilled in the art.

SUMMARY OF INVENTION

Disclosed herein is a method for controlling pre-warming process of an engine of a Hybrid Electric Vehicle (HEV). The method comprises initiating, by a control unit associated with the HEV, pre-warming process of the engine at a first time. The method comprises determining the start-up time of the engine based on at least one of State of Charge (SOC) of a power source, energy consumption by a drive motor of the HEV, energy discharged by the power source, electric range of the vehicle and speed of the vehicle obtained at each of a plurality of first predefined time intervals, wherein the start-up time of the engine is determined at a second time. The method also comprises determining engine heating time for the engine based on one or more predefined parameters. Thereafter, the method comprises discontinuing the pre-warming process of the engine at a third time when the determined start-up time of the engine is greater than the engine heating time. Further, the method comprises restarting the pre-warming process of the engine at a fourth time when the determined start-up time of the engine is less than the engine heating time and when the pre-warming process of the engine is discontinued. The above-mentioned processes are reiterated i.e. the process of determining the start-up time of the engine, determining the engine heating time, discontinuing the pre-warming process and restarting the pre-warming process at a plurality of second predefined time intervals thereby controlling the pre-warming process of an engine.

Further, the present disclosure discloses a control unit for controlling pre-warming process of an engine of a Hybrid Electric Vehicle (HEV). The control unit comprises a processor and a memory communicatively coupled to the processor. The memory stores the processor-executable instructions, which, on execution, causes the processor to initiate pre-warming process of the engine at a first time. Once the pre-warming process is initiated, the processor determines the start-up time of the engine based on at least one of State of Charge (SOC) of a power source, energy consumption by a drive motor of the HEV, energy discharged by the power source, electric range of the vehicle and speed of the vehicle obtained at each of a plurality of first predefined time intervals, wherein the start-up time of the engine is determined at a second time. Thereafter, the processor also determines engine heating time for the engine based on one or more predefined parameters. The processor discontinues the pre-warming process of the engine at a third time when the determined start-up time of the engine is greater than the engine heating time. The processor restarts the pre-warming process of the engine at a fourth time when the determined start-up time of the engine is less than the engine heating time and when the pre-warming process of the engine is discontinued. The processor performs the above-mentioned steps i.e. the process of determining the start-up time of the engine, determining the engine heating time, discontinuing the pre-warming process and restarting the pre-warming process at a plurality of second predefined time intervals, thereby controlling the pre-warming process of an engine.

Furthermore, the present disclosure discloses a control unit for controlling pre-warming process of an engine of a Hybrid Electric Vehicle (HEV). The control unit comprises a processor and a memory communicatively coupled to the processor. The memory stores the processor-executable instructions, which, on execution, causes the processor to initiate pre-warming process of the engine at a first time. Once the pre-warming process is initiated, the processor determines the start-up time of the engine based on at least one of State of Charge (SOC) of a power source, energy consumption by a drive motor of the HEV, energy discharged by the power source, electric range of the vehicle and speed of the vehicle obtained at each of a plurality of first predefined time intervals. The start-up time of the engine is determined at a second time. The control unit determines the engine heating time for the engine based on one or more predefined parameters. Thereafter, the processor determines the start-up time of the engine and the engine heating time at a plurality of second predefined time intervals for controlling the pre-warming process of an engine.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
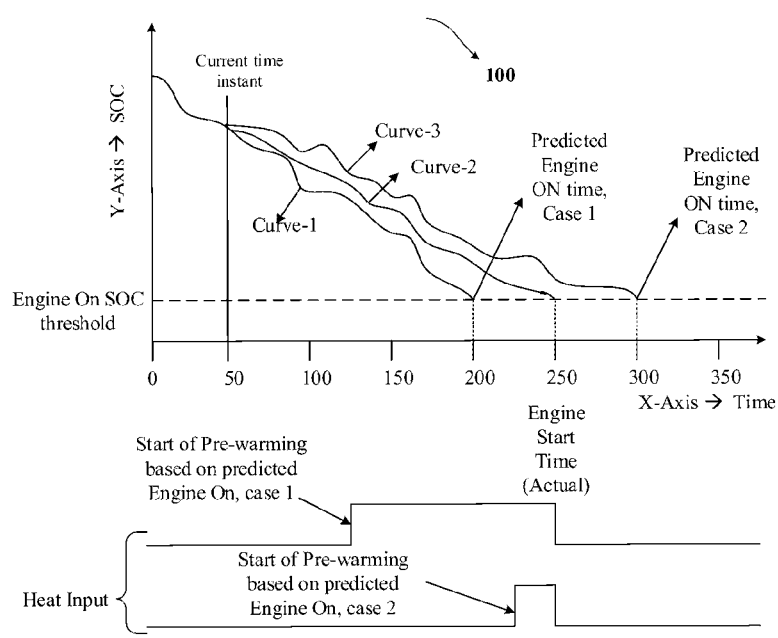
FIG. 1 shows a graph illustrating pre-warming process in accordance with prior art.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DESCRIPTION OF EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a control unit for controlling pre-warming process of an engine of a Hybrid Electric Vehicle (HEV). In order to control pre-warming process of the engine, the control unit has to determine start-up time of the engine and the engine heating time. The control unit may determine the start-up time of the engine based on at least one of State of Charge (SOC) of a power source, energy consumption by a drive motor of the HEV, energy discharged by the power source, electric range of the vehicle and speed of the vehicle. The engine heating time is determined based on parameters such as ambient temperature, temperature of the power source, temperature of an engine coolant, temperature of a power source coolant and flow rate of the coolant. Once the engine start-up time and the engine heating time is determined, the control unit may initiate pre-warming process of the engine based on the engine start-up time and the engine heating time.

The pre-warming process is initiated when the engine start-up time is less than the engine heating time. The control unit may continuously determine the engine start-up time and the engine heating time. Based on these, the control unit may perform actions such as discontinuing the pre-warming process or restarting the pre-warming process. The control unit may discontinue the pre-warming process when the start-up time of the engine is greater than the engine heating time. The control unit may re-start the pre-warming process of the engine when the determined start-up time of the engine is less than the engine heating time and when the pre-warming process of the engine is discontinued. In this manner, the control unit controls the pre-warming process of the engine by continuously determining the engine start-up time and the engine heating time. The present disclosure accurately determines the engine start-up time and controls the pre-warming process based on the detected start-up time which results in energy efficiency in terms of improving fuel efficiency and sufficient heat for the engine warm-up.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2:
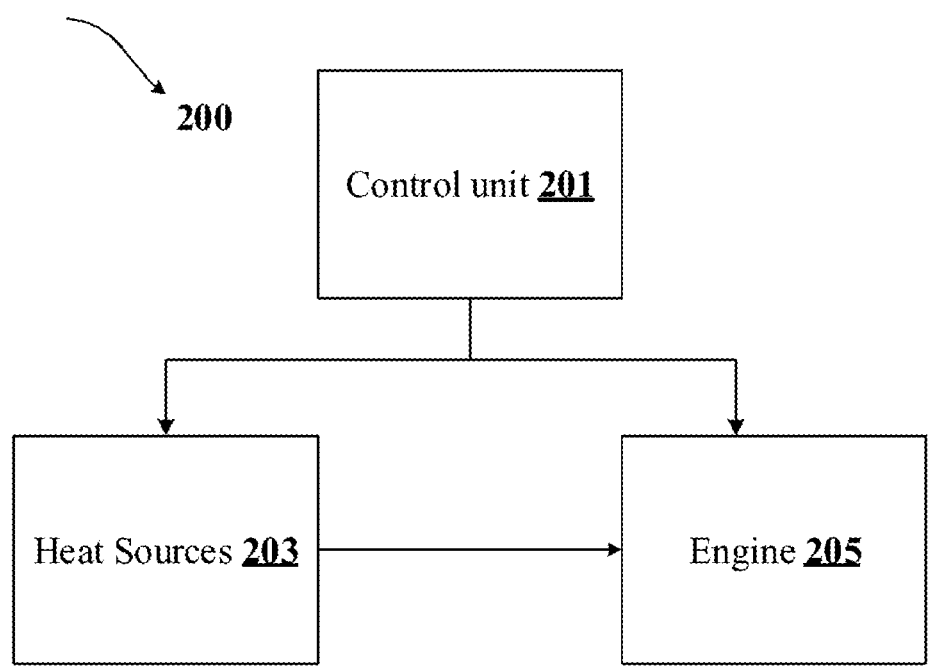
FIG. 2 shows an exemplary environment for controlling pre-warming process of an engine of a Hybrid Electric Vehicle (HEV) in accordance with some embodiments of the present disclosure.

FIG. 2 illustrates an exemplary environment for controlling pre-warming process of an engine of a Hybrid Electric Vehicle (HEV) in accordance with some embodiments of the present disclosure.

Figure 10A:
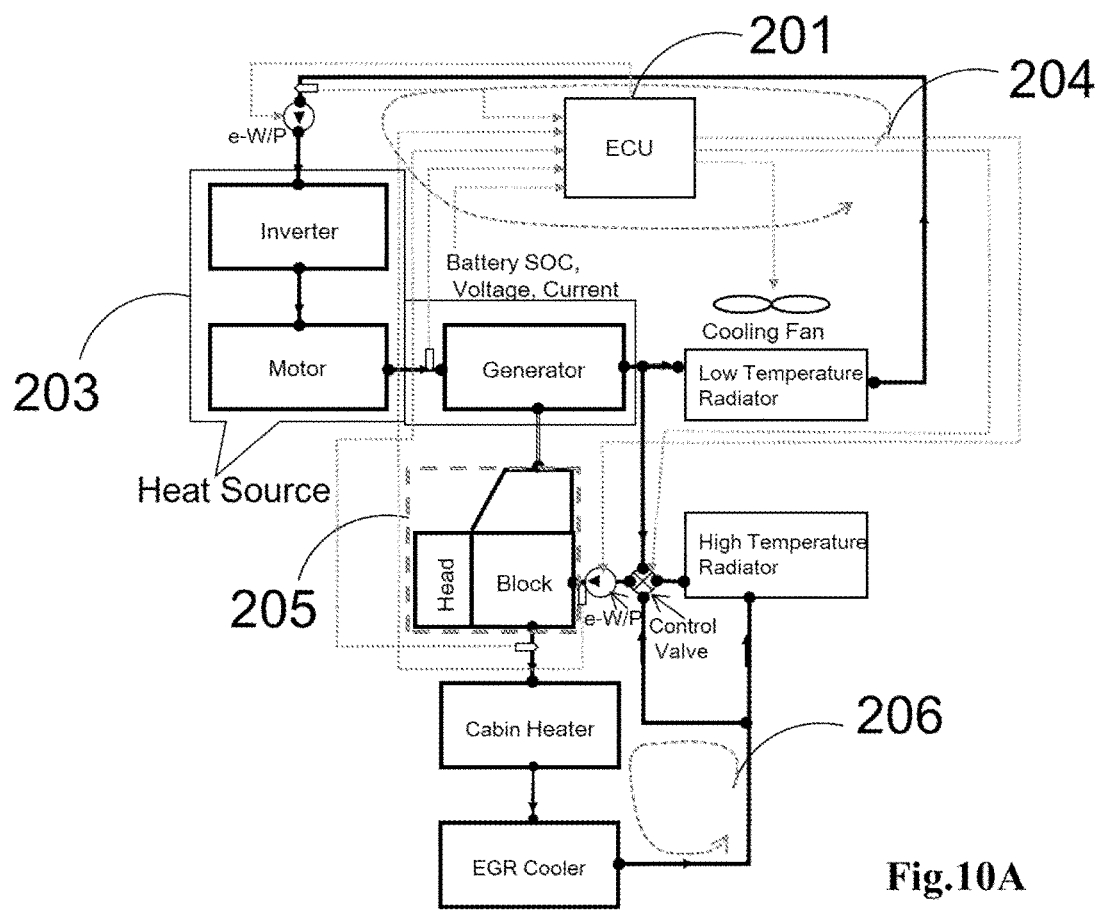
FIG. 10A shows implementation of pre-warming process of the engine using one or more heat sources in accordance with some embodiments of the present disclosure.
Figure 10B:
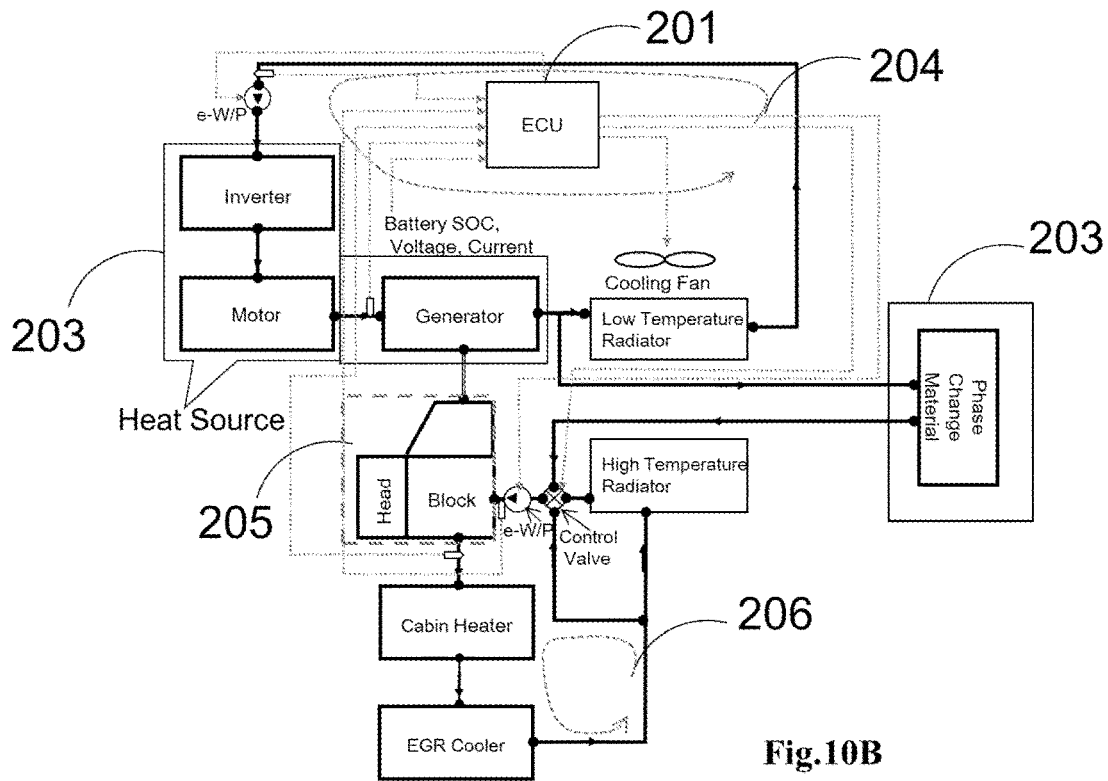
FIG. 10B shows implementation of pre-warming process of the engine using one or more heat sources in accordance with some embodiments of the present disclosure.
Figure 10C:
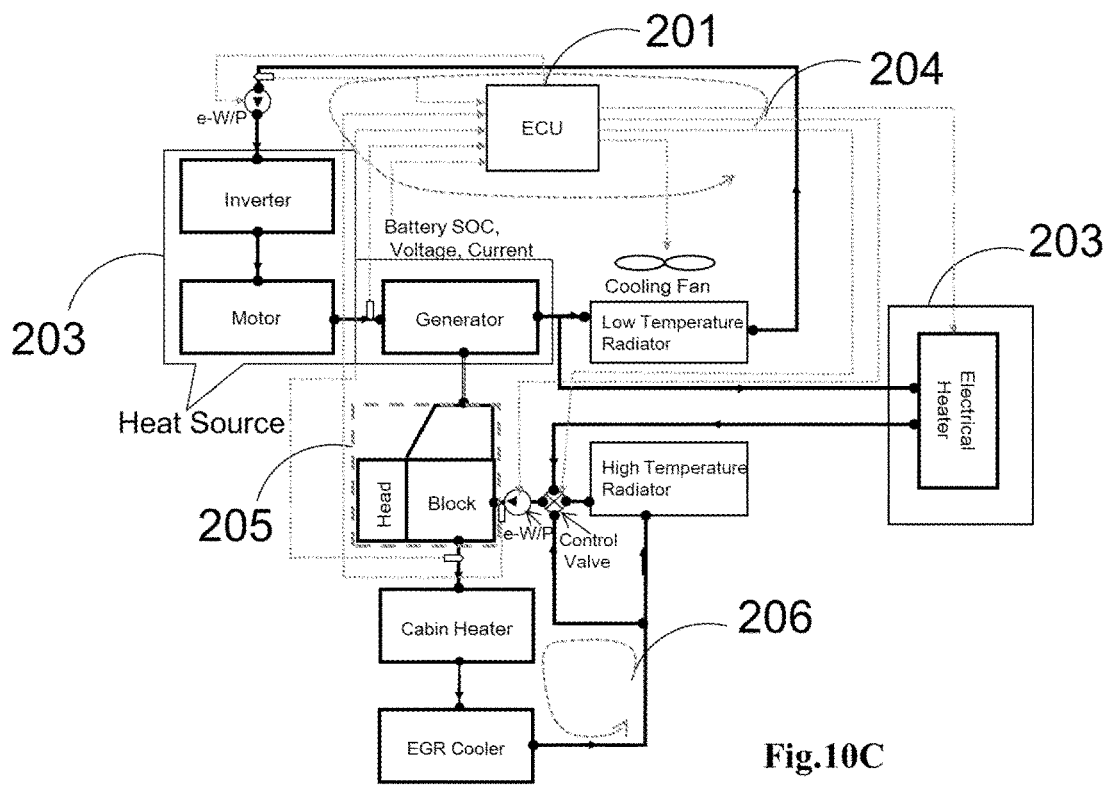
FIG. 10C shows implementation of pre-warming process of the engine using one or more heat sources in accordance with some embodiments of the present disclosure.
Figure 10D:
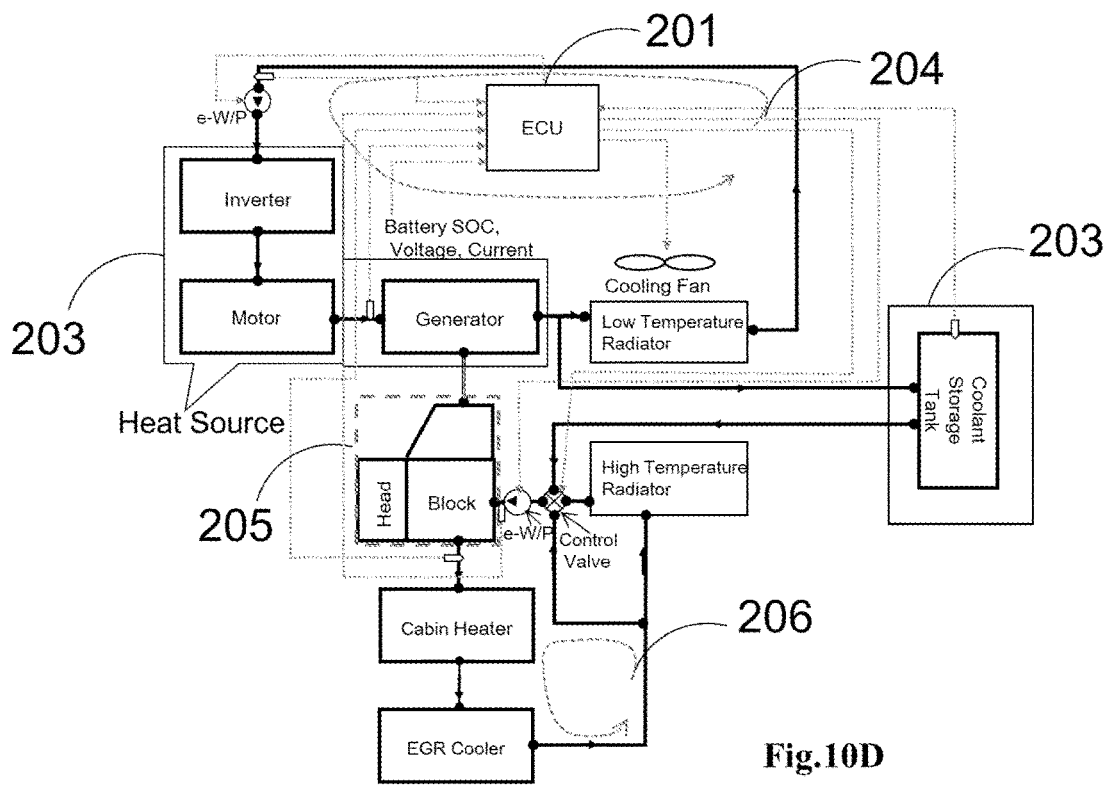
FIG. 10D shows implementation of pre-warming process of the engine using one or more heat sources in accordance with some embodiments of the present disclosure.

As shown in FIG. 2, the environment 200 comprises a control unit 201, one or more heat sources 203 and an engine 205. The control unit may be configured to control pre-warming process of the engine 205. The control unit 201 may be associated with the one or more heat sources 203 for pre-warming the engine 205. The pre-warming of the engine 205 is essential in order to improve fuel efficiency of the vehicle. The one or more heat sources 203 may include, but are not limited to, heated coolant stored in a storage tank of the vehicle, electrical heating, waste heat recovered from other components in the HEV and heat from phase change materials. The process of pre-warming the engine through each of the one or more heat sources is illustrated in FIGS. 10A-10D. FIG. 10A illustrates the process of pre-warming the engine using the heat recovered from other components in the HEV. FIG. 10B illustrates the process of pre-warming the engine using the heat from phase change materials. FIG. 10C illustrates the process of pre-warming the engine using the electrical heating. FIG. 10D illustrates the process of pre-warming the engine using the heated coolant stored in a storage tank of the vehicle.

In order to control the pre-warming process of the engine 205, the control unit 201 may determine start-up time of the engine 205 (alternately referred as engine start-up time) and the engine heating time. The start-up time may refer to the time at which the engine 205 is going to be started. The engine heating time may refer to the time taken by the engine 205 for warming up the engine 205. The control unit 201 may determine the engine start-up time based on at least one of State of Charge (SOC) of a power source of the HEV, energy consumption by a drive motor of the HEV, energy discharged by the power source, electric range of the vehicle and speed of the vehicle. In another embodiment, the control unit may calculate a change in quantity of at least one of State of Charge (SOC) of a power source, energy consumption by a drive motor of the HEV, energy discharged by the power source, electric range of the vehicle and speed of the vehicle obtained at each of a plurality of first predefined time intervals. Thereafter, the control unit 201 may determine the start-up time of the engine (205) based on the change in quantity at each of a plurality of the first predefined time intervals. In an embodiment, the engine start-up time is determined at plurality of first predefined time intervals. As an example, at every 10 seconds, the process of determining the engine start-up time is performed.

In an embodiment, the control unit 201 may determine engine heating time based on one or more parameters which includes, but are not limited to, ambient temperature of the engine 205, temperature of the power source, temperature of an engine coolant, temperature of a power source coolant and flow rate of the coolant. The control unit 201 may store data associated with the engine heating time in a memory associated with the control unit 201 in the form of a look-up table. The look-up table may store data of the engine heating time and also the time at which the heating time is recorded.

In an embodiment, the control unit 201 may compare the engine start-up time with the engine heating time. The control unit 201 may initiate pre-warming process of the engine 205 when the start-up time of the engine 205 is less than the engine heating time. Also, the pre-warming process is initiated prior to the start-up time of the engine 205. When the start-up time of the engine 205 is greater than the engine heating time, the control unit 201 may discontinue the process of pre-warming. The control unit 201 may restart the pre-warming process when the determined start-up time of the engine 205 is less than the engine heating time and when the pre-warming process of the engine 205 is discontinued. The control unit 201 may continuously determine the start-up time of the engine 205 and the engine heating time. Based on this, the process of initiating the pre-warming, discontinuing the pre-warming and restarting the pre-warming is performed at plurality of second predefined time intervals in order to control the pre-warming process of the engine 205.

Figure 3:
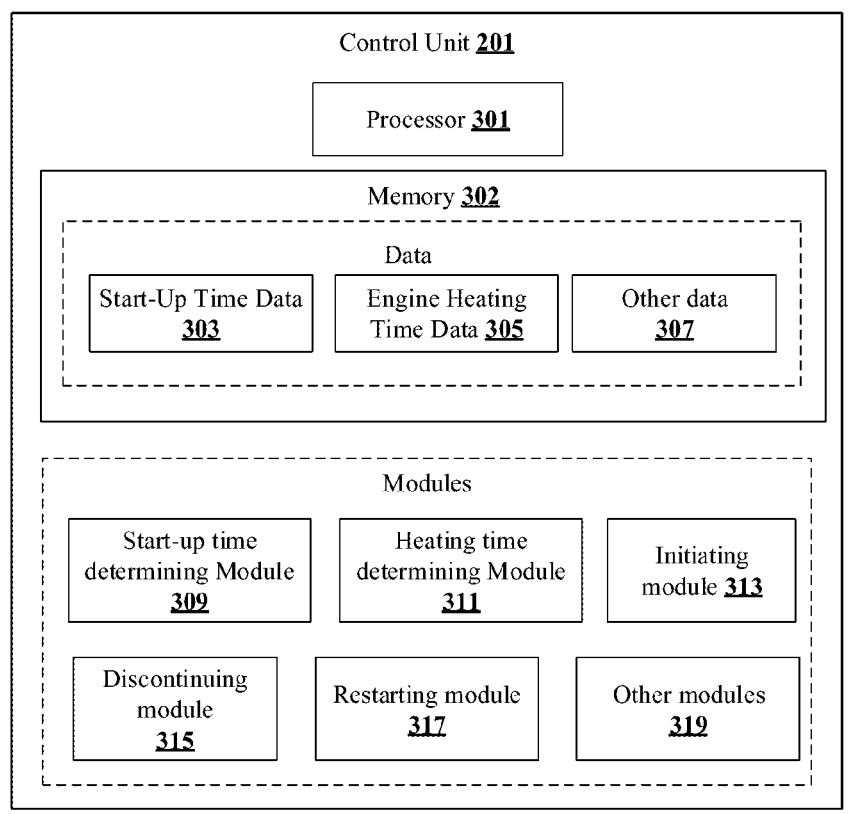
FIG. 3 shows a block diagram of a control unit for controlling pre-warming process of an engine of a HEV, in accordance with some embodiments of the present disclosure.

FIG. 3 shows a block diagram of a control unit for controlling pre-warming process of an engine of a Hybrid Electric Vehicle (HEV), in accordance with some embodiments of the present disclosure.

As shown in FIG. 3, the control unit 201 may comprise a processor 301 and a memory 302. The processor 301 may be configured to perform one or more functions of the control unit 201. In some implementations, the control unit 201 may include data and modules for performing various operations in accordance with embodiments of the present disclosure. In an embodiment, the data may be stored within the memory 302 and may include, without limiting to, start-up time data 303, engine heating time data 305 and other data 307.

In some embodiments, the data may be stored within the memory 302 in the form of various data structures. Additionally, the data may be organized using data models, such as relational or hierarchical data models. The other data may store data, including temporary data and temporary files, generated by the modules for performing various functions of the control unit 201.

In an embodiment, one or more modules may process the data of the control unit 201. In one implementation, the one or more modules may be communicatively coupled to the processor 301 for performing one or more functions of the control unit 201. The modules may include, without limiting to, a start-up time determining module 309, a heating time determining module 311, an initiating module 313, a discontinuing module 315, a restarting module 317 and other modules 319.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 319 may be used to perform various miscellaneous functionalities of the content personalization module. It will be appreciated that such modules may be represented as a single module or a combination of different modules. Furthermore, a person of ordinary skill in the art will appreciate that in an implementation, the one or more modules may be stored in the memory, without limiting the scope of the disclosure. The said modules when configured with the functionality defined in the present disclosure will result in a novel hardware.

Figure 4:
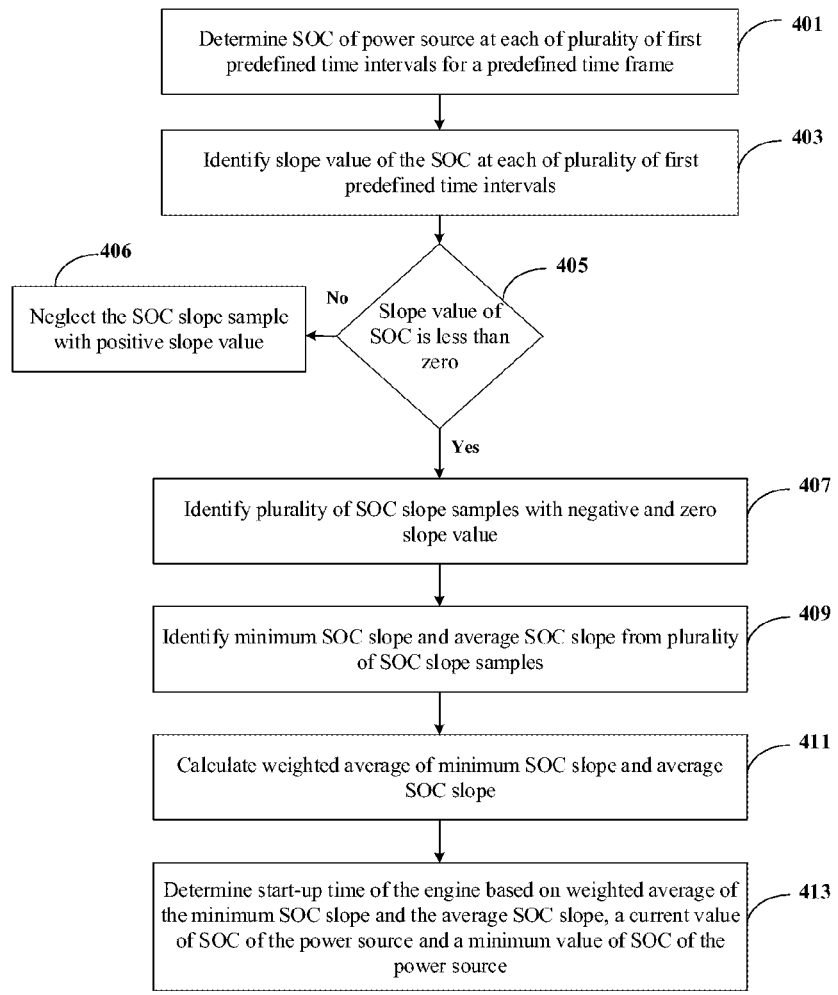
FIG. 4 shows a flowchart illustrating a process of determining start-up time of engine based on State of Charge (SOC) of a power source in accordance with some embodiments of the present disclosure.
Figure 5:
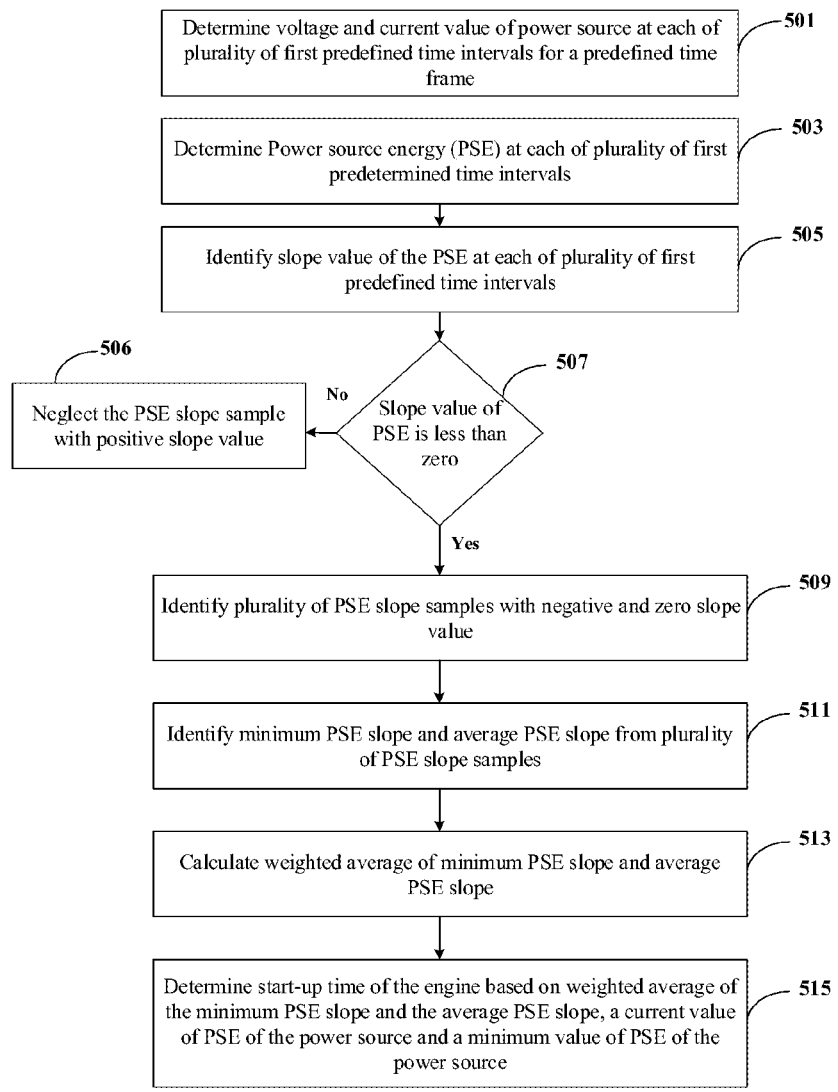
FIG. 5 shows a flowchart illustrating a process of determining start-up time of engine based on voltage and current value of power source in accordance with some embodiments of the present disclosure.
Figure 6:
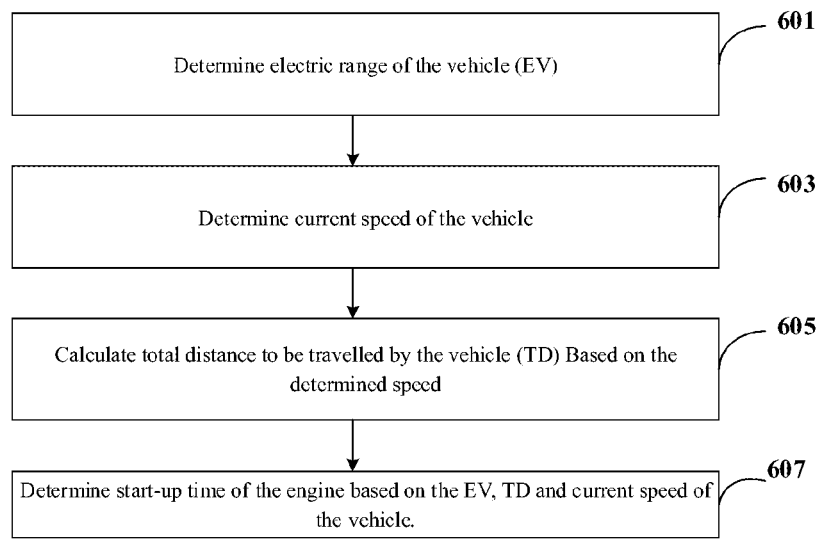
FIG. 6 shows a flowchart illustrating a process of determining start-up time of engine based on electric range of vehicle in accordance with some embodiments of the present disclosure.
Figure 7:
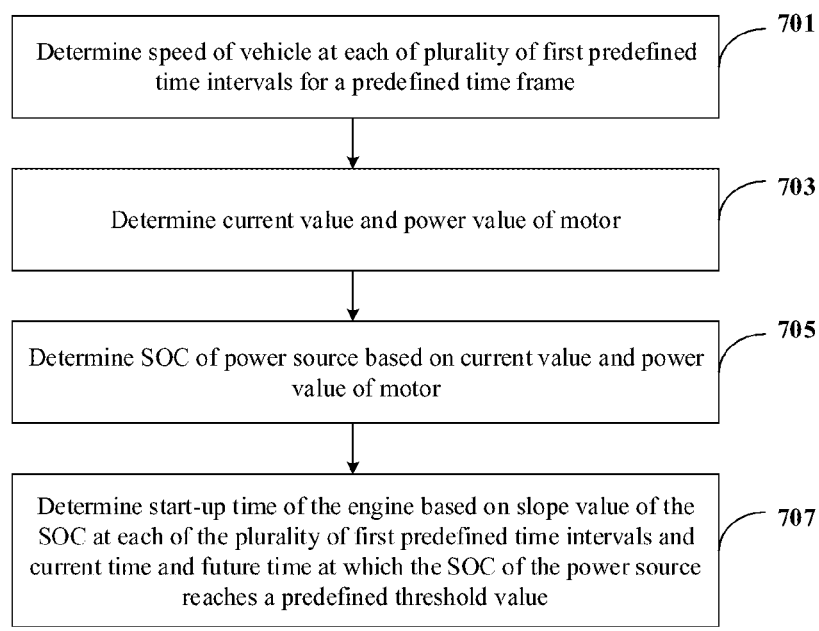
FIG. 7 shows a flowchart illustrating a process of determining start-up time of engine based on speed of a vehicle in accordance with some embodiments of the present disclosure.

In an embodiment, the start-up time determining module 309 may be configured to determine the start-up time of the engine 205. The start-up time of the engine 205 may be determined based on at least one of SOC of a power source of the HEV, energy consumption by a drive motor of the HEV, energy discharged by the power source, electric range of the vehicle and speed of the vehicle. The determined start-up time of the engine 205 is stored as start-up time data 303 in the memory. The process of determining the start-up time of the engine 205 based on SOC of the power source is illustrated in FIG. 4. The process of determining start-up time of the engine 205 based on the energy discharged by the power source is illustrated in FIG. 5. The process of determining the start-up time of the engine 205 based on electric range of the vehicle is illustrated in FIG. 6. The process of determining the start-up time of the engine 205 based on speed of the vehicle is illustrated in FIG. 7.

In an embodiment, the heating time determining module 311 may be configured to determine heating time of the engine 205 i.e. the time taken to pre-warm the engine 205. The heating time of the engine may be stored as engine heating time data 305. The heating time of the engine 205 may be determined based on one or more parameters comprising ambient temperature of the engine 205, temperature of the power source in the vehicle, temperature of an engine coolant being used for pre-warming process, temperature of a power source coolant and flow rate of the coolant.

In an embodiment, the initiating module 313 may be configured to initiate the pre-warming process of the engine 205. The initiating module initiates the pre-warming process when the start-up time of the engine 205 is less than the engine heating time.

In an embodiment, the discontinuing module 315 may be configured to discontinue the pre-warming process of the engine 205 when the start-up time of the engine 205 is greater than the engine heating time. If the process of pre-warming is not discontinued even if the start-up time of the engine 205 is greater than the engine heating time, this would result in wastage of energy as the pre-warming process is started early.

In an embodiment, the restarting module 317 may be configured to restart the pre-warming process of the engine 205 when the start-up time of the engine 205 is less than the engine heating time and when the pre-warming process is discontinued.

In an embodiment, the control unit 201 may continuously determine the start-up time of the engine 205 and the engine heating time based on which the process of initiating the pre-warming, discontinuing the pre-warming and restarting the pre-warming is performed at plurality of second predefined time intervals in order to control the pre-warming process of the engine 205.

FIG. 4 shows a flowchart illustrating a process of determining start-up time of engine based on State of Charge (SOC) of a power source in accordance with some embodiments of the present disclosure.

At block 401, the control unit 201 may determine SOC of the power source at each of the plurality of first predefined time intervals for a predefined time frame. As an example, the predefined time frame may be 10 minutes. In the 10 minutes time frame, the control unit 201 may determine the SOC of the power source at frequent time intervals such as every 10 seconds.

At block 403, the control unit 201 may identify slope value of the SOC (dSOC/dt) at each of the plurality of first predefined time intervals.

At block 405, the control unit 201 may check for SOC slope samples with positive slope value and SOC slope samples with negative slope value. If the slope value of the SOC is less than zero, the method proceeds to block 407 via "yes". If the slope value of the SOC is greater than zero, the method proceeds to block 406. At block 406, the SOC slope samples with positive slope values are neglected.

At block 407, the control unit 201 may identify plurality of SOC slope samples with negative slope value and zero slope value from the slope value of the SOC at each of the plurality of first predefined time intervals.

At block 409, the control unit 201 may identify a minimum SOC slope and an average SOC slope from the plurality of SOC slope samples. The minimum SOC slope (dSOC_min/dt) is the SOC slope sample with minimum value among the plurality of SOC slope samples and average SOC slope (dSOC_avg/dt) is based on average value of the plurality of SOC slope samples.

At block 411, the control unit 201 may calculate a weighted average of the minimum SOC slope and the average SOC slope (dSOC_wavg/dt) based on the minimum SOC slope, the average SOC slope and a predefined weightage value associated with the minimum SOC slope and the average SOC slope respectively. The weighted average may be calculated based on predetermined weightage values w1 and w2. The weightage value w1 may be assigned to minimum SOC slope and weightage value w2 may be assigned to average SOC slope. As an example, w1 may be 20% and w2 may be 80%. The dSOC_wavg/dt may be calculated based on the equation 1 given below.

$$dSOC\_wavg/dt = w1(dSOC\_min/dt) + w2(dSOC\_avg/dt) \quad \text{Equation 1}$$

At block 413, the control unit 201 may determine the start-up time of the engine 205 (T SOC_wavg) based on the weighted average of the minimum SOC slope and the average SOC slope, a current value of SOC (SOCcurr) of the power source and a minimum value of SOC of the power source (SOClow) among the SOC of the power source at each of the plurality of first predefined time intervals in the predefined time frame as represented in the Equation 2 below $$T\ SOC\_wavg = (SOCcurr - SOClow)/(dSOC\_wavg/dt) \quad \text{Equation 2}$$

FIG. 5 shows a flowchart illustrating a process of determining start-up time of engine based on voltage and current value of power source in accordance with some embodiments of the present disclosure.

At block 501, the control unit 201 may determine voltage and current value of the power source at each of the plurality of first predefined time intervals for a predefined time frame. As an example, the predefined time frame may be 10 minutes. In the 10 minutes time frame, the control unit 201 may determine voltage and current value of the power source at frequent time intervals such as every 10 seconds.

At block 503, the control unit 201 may determine Power Source Energy (PSE) at each of the plurality of first predefined time intervals based on the voltage and current value of the power source.

At block 505, the control unit 201 identify slope value of the PSE (dEnergy/dt or dE/dt) at each of the plurality of first predefined time intervals.

At block 507, the control unit 201 may check for PSE slope samples with positive slope value and PSE slope samples with negative slope value. If the slope value of the PSE is less than zero, the method proceeds to block 509 via "yes". If the slope value of the PSE is greater than zero, the method proceeds to block 506. At block 506, the PSE slope samples with positive slope values are neglected and the method proceeds to block 501 until the negative slope values are obtained.

At block 509, the control unit 201 may identify plurality of PSE slope samples with negative slope value and zero slope value from the slope value of the PSE at each of the plurality of first predefined time intervals.

At block 511, the control unit 201 may identify a minimum PSE slope and an average PSE slope from the plurality of PSE slope samples. The minimum PSE slope (dE_min/dt) is the PSE slope sample with minimum value among the plurality of PSE slope samples and average SOC slope (dE_avg/dt) is based on average value of the plurality of PSE slope samples.

At block 513, the control unit 201 may calculate a weighted average of the minimum PSE slope and the average PSE slope (dE_wavg/dt) based on the minimum PSE slope, the average PSE slope and a predefined weightage value associated with the minimum PSE slope and the average PSE slope respectively. The weighted average may be calculated based on predetermined weightage values w1 and w2. w1 may be assigned to minimum PSE slope and w2 may be assigned to average PSE slope. As an example, w1 may be 20% and w2 may be 80%. The dSOC_wavg/dt may be calculated based on the Equation 3 given below.

$$dE\_wavg/dt = w1(dE\_min/dt) + w2(dE\_avg/dt) \quad \text{Equation 3}$$

At block 515, the control unit 201 may be configured to determine the start-up time of the engine 205 (T Energy_wavg) based on the weighted average of the minimum PSE slope and the average PSE slope, a current value of PSE (Ecurr) of the power source and a minimum value of PSE of the power source (Elow) among the PSE of the power source at each of the plurality of first predefined time intervals in the predefined time frame as represented in the Equation 4 below.

$$T\ Energy\_wavg = (Ecurr - Elow)/(dE\_wavg/dt) \quad \text{Equation 4}$$

FIG. 6 shows a flowchart illustrating a process of determining start-up time of engine based on electric range of the vehicle in accordance with some embodiments of the present disclosure.

At block 601, the control unit 201 may determine electric range of the vehicle at each of the plurality of first predefined time intervals for a predefined time frame. As an example, the predefined time frame may be 10 minutes. In the 10 minutes time frame, the control unit 201 may determine voltage and current value of the power source at frequent time intervals such as every 10 seconds The electric range of the vehicle may be determined based on parameters which includes, but are not limited to of the power source, ambient temperature of the engine 205, Air Conditioner (AC) state of the vehicle, temperature of the vehicle, average speed information of the vehicle.

At block 603, the control unit 201 may determine current speed of the vehicle based on speed sensors within ECU of the vehicle. The current speed may be determined based on parameters such as wheel rotation speed sensor and tire radius, gear ratio and differential operation.

At block 605, the control unit 201 may calculate total distance to be travelled by the vehicle (TD) based on the determined speed.

At block 607, the control unit 201 may determine the start-up time of the engine 205 based on the EV, TD and the current speed of the vehicle using the Equation 5 given below.

$$\text{Start Time of the Engine 205} = \text{electric range of the vehicle} - \text{total distance to be travelled by the vehicle}/\text{current speed of the vehicle} \quad \text{Equation 5}$$

FIG. 7 shows a flowchart illustrating a process of determining start-up time of engine based on speed of a vehicle in accordance with some embodiments of the present disclosure.

At block 701, the control unit 201 may be configured to determine speed of the vehicle at each of the plurality of first predefined time intervals for a predefined time frame. The predefined time frame in this scenario is a future time where the speed of the vehicle is predicted. As an example, the predefined time frame may be 1-2 pm on a particular day. In the given time frame, the control unit 201 may determine voltage and current value of the power source at frequent time intervals such as every 10 seconds. As an example, the speed of the vehicle may be determined based on parameters such as traffic condition in a route to be travelled by the HEV, route information of the HEV, historical data associated with speed of the HEV, condition of the power source of the HEV, Air Conditioner (AC) consumption, HEV parameters and road parameters.

At block 703, the control unit 201 may determine current value and power value of a motor configured to generate driving power for the vehicle based on speed of the vehicle.

At block 705, the control unit 201 may determine SOC of the power source based on the current value and power value of the motor. Once the SOC of the power source is identified, the control unit 201 may determine slope of the SOC value using the method disclosed in FIG. 4 illustration.

At block 707, the control unit 201 may determine the start-up time of the engine 205 based on at least one of slope value of the SOC at each of the plurality of first predefined time intervals and current time and future time at which the SOC of the power source reaches a predefined threshold value. This is based on SOC variation which occurs in future time. As an example, at the current time, the future 200/500 values of the SOC may be predicted and stored in the memory 302. Thereafter, the future time at which the SOC reaches the predefined threshold value may be identified from the 200/500 values stored in the memory. As an example, the predefined threshold value may be 50%.

Figure 8:
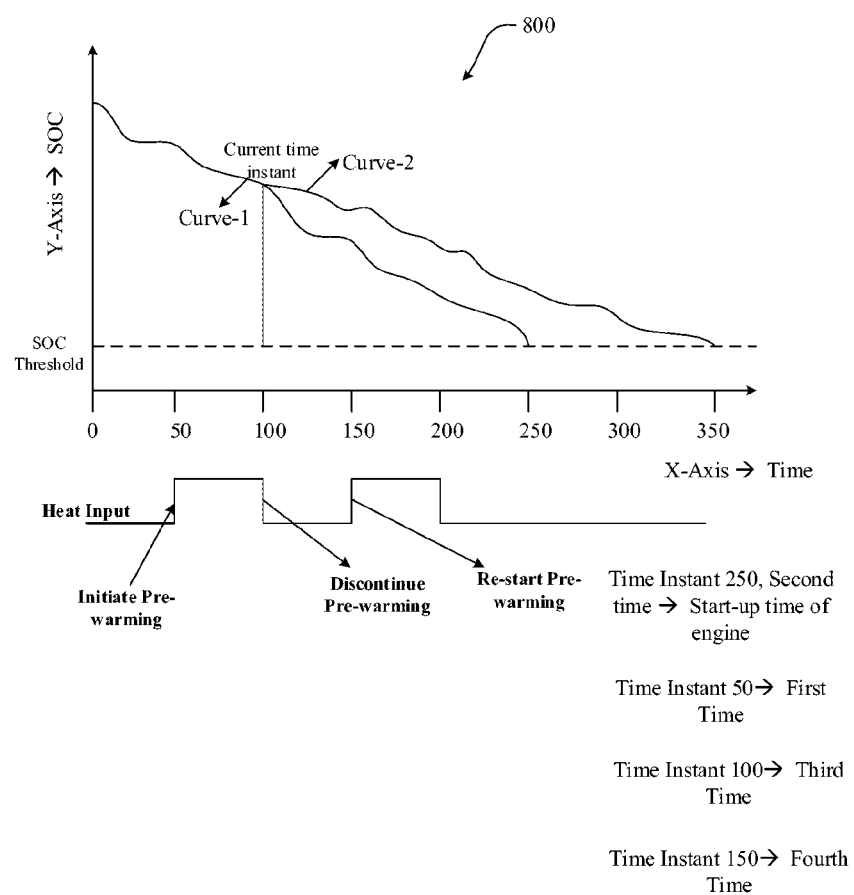
FIG. 8 shows a graph illustrating an exemplary process of controlling pre-warming process of an engine of a HEV in accordance with some embodiments of the present disclosure.

FIG. 8 shows a graph illustrating an exemplary process of controlling pre-warming process of an engine of a HEV in accordance with some embodiments of the present disclosure.

As shown in the graph 800, the x-axis represents time i.e. the start-up time of the engine 205 and y-axis represents the SOC of the power source. For the purpose of illustration and as an example only, the SOC of the power source is used for determining the start-up time of the engine 205. Based on the SOC of the power source, represented in the y-axis, the start-up time of the engine 205 is predicted in x-axis as shown in the graph 800.

As an example, the start-up time of the engine 205 determined based on the SOC of the power source, may be at the time instant "250" as represented by curve 1. As an example, the control unit 201 may determine the engine heating time to be "200 seconds" i.e., the engine 205 may take "200 seconds" for the warm-up. The control unit 201 compares the engine heating time and the start-up time of the engine 205. Since the start-up time of the engine 205 is less than the engine heating time, the control unit 201 initiates the pre-warming process at the time instant "50" which is the "first time". The pre-warming process is initiated at the time instant "50" since it needs "200 seconds" to warm up the engine 205 as the engine 205 would start at the time instant "250". The time at which the start-up time of the engine 205 is determined may be represented as "second time".

Since the control unit 201 continuously determines the start-up time of the engine 205 and the engine heating time, the control unit 201 may determine the start-up of the engine 205 as shown in curve 2 in the graph 800 at the current time instant. As an example, the start-up time of the engine 205 which is detected in this scenario would be at the time instant "350" and the engine heating time may be "200 seconds". Since the start-up time of the engine 205 is greater than the engine heating time which is "200 seconds", the control unit 201 may discontinue the pre-warming process of the engine 205 at a "third time" instant which is "100".

Further, when the control unit 201 determines the start-up time of the engine 205 to be less than the engine heating time, the control unit 201 may restart the pre-warming process of the engine 205. Hence the control unit 201 may restart the process of pre-warming at a "fourth time" "150" as shown in the graph 800.

In this manner, the control unit 201 continuously determines the engine heating time and the start-up time of the engine 205 at plurality of time intervals based on which the process of the initiating the pre-warming, discontinuing the pre-warming and restarting the pre-warming is performed continuously in order to control the pre-warming process of the engine 205.

Figure 9:
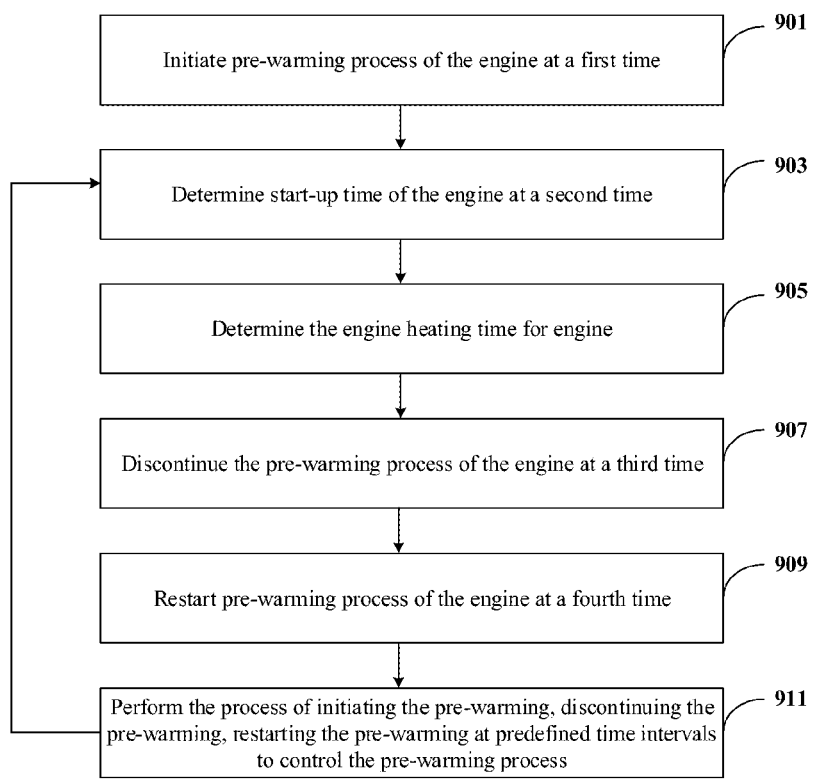
FIG. 9 shows a flowchart illustrating a method of controlling pre-warming process of an engine of a HEV in accordance with some embodiments of the present disclosure.

FIG. 9 shows a flowchart illustrating a method of controlling pre-warming process of an engine of a HEV in accordance with some embodiments of the present disclosure.

As illustrated in FIG. 9, the method comprises one or more blocks illustrating a method controlling pre-warming process of an engine 205 of a HEV. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 901, the control unit 201 may initiate pre-warming process of the engine 205 at a first time.

At block 903, the control unit 201 may determine start-up time of the engine 205 based on at least one of State of Charge (SOC) of a power source, energy consumption by a drive motor of the HEV, energy discharged by the power source, electric range of the vehicle and speed of the vehicle obtained at each of a plurality of first predefined time intervals. The time at which the start-up time is determined may be represented as a second time.

At block 905, the control unit 201 may determine the engine heating time for the engine 205 based on one or more predefined parameters. The one or more predefined parameters may include, but are not limited to ambient temperature, temperature of the power source, temperature of an engine coolant, temperature of a power source coolant and flow rate of the coolant.

At block 907, the control unit 201 may discontinue the pre-warming process of the engine 205 at a third time if the determined start-up time of the engine 205 is greater than the engine heating time.

At block 911, the control unit 201 may restart the pre-warming process of the engine 205 at a fourth time if the determined start-up time of the engine 205 is less than the engine heating time and when the pre-warming process of the engine 205 is discontinued.

At block 913, the control unit 201 may perform the process of determining the start-up time of the engine 205, determining the engine heating time, discontinuing the pre-warming process and restarting the pre-warming process at a plurality of second predefined time intervals for controlling the pre-warming process of an engine 205. The process of determining the start-up time of the engine 205 and the engine heating time is performed at regular time intervals for controlling the pre-warming process of the engine 205.

FIG. 10A illustrates the process of pre-warming the engine using the heat recovered from other components in the HEV. FIG. 10B illustrates the process of pre-warming the engine using the heat from Phase Change Materials (PCM). FIG. 10C illustrates the process of pre-warming the engine 205 using the electrical heating. FIG. 10D illustrates the process of pre-warming the engine 205 using the heated coolant stored in a storage tank of the vehicle. As shown in FIGS. 10A, 10B, 100 and 10D arrow marks from each block such as inverter, motor, generator, low temperature radiator, head block, cabin heater, Exhaust Gas Recirculation (EGR)

cooler and high temperature radiator indicate direction of coolant flow. The heat sources for pre-warming the engine 205 are inverter, motor and generator which are High Voltage (HV) components in HV cooling loop 204. As shown in FIG. 10A, the control valve may be switched to direct the coolant flow from HV cooling loop to engine cooling loop 206 based on a control signal. The control signal is based on the decision made by the ECU/control unit 201 for the pre-warming process.

As shown in FIG. 10B, the control valve may be switched to direct the coolant flow from HV cooling loop 204 to engine cooling loop 206 through PCM heat exchange based on control signal. Alternatively, any one among PCM or HV cooling can be used based on how coolant loop is installed in the HEV. The control signal is based on the decision made by ECU 201 for pre-warming process.

As shown in FIG. 10C, the electrical heater (conventionally, Positive Temperature Coefficient (PTC) material based) used for pre-warming process of the engine 205. The control valve may be switched to direct the coolant flow from HV cooling loop to engine cooling loop 206 through PTC heat exchanger based on a control signal. Alternatively, any one among PTC or HV cooling can be used based on how coolant loop is installed in the HEV. The control signal is based on the decision made by ECU 201 for the pre-warming process.

As shown in FIG. 10D the heated coolant stored in a storage tank is used for the pre-warming process of the engine 205. The heated coolant may be either from HV components/engine/both). As an example, the heated coolant received from HV is shown in FIG. 10D. The control valve may be switched to direct the hot coolant flow from the storage tank to engine cooling loop 206 based on a control signal. The control signal is based on a decision made by ECU 201 for the pre-warming process.

In an embodiment, once the pre-warming process is performed, the control valve may be used to achieve other conventional objectives which may include, but not limited to, coolant temperature and cabin heating.

Advantages of Present Disclosure

In an embodiment, the present disclosure provides a method and system for controlling pre-warming process of an engine of a Hybrid Electric Vehicle (HEV).

In an embodiment, the present disclosure determines start-up time of the engine using multiple State of Charge (SOC) of the power source which results in accurate prediction of the engine start-up time.

In an embodiment, the present disclosure controls the pre-warming process of the engine based on the determined start-up time which results in energy efficiency and provides sufficient time for the engine warm-up.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE SIGNS LIST

100: Graph [Prior Art]
200: Environment
201: Control unit
203: Heat Sources
205: Engine
301: Processor
302: Memory
303: Start-up time data
305: Engine heating time data
307: Other data
309: Start-up time determining module
311: Heating time determining module
313: Initiating module
315: Discontinuing module
317: Restarting module
319: Other modules

The invention claimed is:

1. A method for controlling a pre-warming process of an engine of a Hybrid Electric Vehicle (HEV), the method comprising:
    initiating, by a control unit associated with the HEV, the pre-warming process of the engine at a first time;
    determining, by the control unit, a start-up time of the engine based on at least one of State of Charge (SOC) of a power source, energy consumption by a drive motor of the HEV, energy discharged by the power source, electric range of the vehicle and speed of the vehicle obtained over a plurality of first predefined time intervals, wherein the start-up time of the engine is determined at a second time, wherein determining the start-up time of the engine comprises
determining the SOC of the power source at each of the plurality of first predefined time intervals for a predefined time frame,
identifying a slope value of the SOC at each of the plurality of first predefined time intervals,
identifying a plurality of SOC slope samples with negative slope value and zero slope value from the slope value of the SOC at each of the plurality of first predefined time intervals,
identifying a minimum SOC slope and an average SOC slope from the plurality of SOC slope samples, wherein the minimum SOC slope is the SOC slope sample with minimum value among the plurality of SOC slope samples and average SOC slope is based on average value of the plurality of SOC slope samples,
calculating a weighted average of the minimum SOC slope and the average SOC slope based on the minimum SOC slope, the average SOC slope and a predefined weightage value associated with the minimum SOC slope and the average SOC slope respectively, and
determining the start-up time of the engine based on the weighted average of the minimum SOC slope and the average SOC slope, a current value of SOC of the power source and a minimum value of SOC of the power source among the SOC of the power source at each of the plurality of first predefined time intervals in the predefined time frame;
determining, by the control unit, an engine heating time for the engine based on one or more predefined parameters;
discontinuing, by the control unit, the pre-warming process of the engine at a third time when the determined start-up time of the engine is greater than the engine heating time;
restarting, by the control unit, the pre-warming process of the engine at a fourth time when the determined start-up time of the engine is less than the engine heating time and when the pre-warming process of the engine is discontinued; and
performing, by the control unit, the process of determining the start-up time of the engine, determining the engine heating time, discontinuing the pre-warming process and restarting the pre-warming process over second predefined time intervals thereby controlling the pre-warming process of the engine.

2. The method as claimed in claim 1, wherein the pre-warming process of the engine is initiated prior to the start-up time of the engine.

3. The method as claimed in claim 1, wherein the one or more parameters comprises ambient temperature, temperature of the power source, temperature of an engine coolant, temperature of a power source coolant and flow rate of the coolant.

4. The method as claimed in claim 1, wherein the second time is later than the first time.

5. The method as claimed in claim 1, wherein the pre-warming process of the engine is initiated when the start-up time of the engine is less than the engine heating time.

6. The method as claimed in claim 1, wherein determining the start-up time of the engine comprises:
determining a speed of the vehicle at each of the plurality of first predefined time intervals for a predefined time frame;
determining a current value and power value of a motor configured to generate driving power for the vehicle based on the speed of the vehicle;
determining SOC of the power source based on the current value and power value of the motor; and
determining the start-up time of the engine based on at least one of slope value of the SOC at each of the plurality of first predefined time intervals and a future time at which the SOC of the power source reaches a predefined threshold value.

7. The method as claimed in claim 6, wherein the speed of the HEV is determined based on one or more parameters, in the predefined time frame, comprising traffic condition in a route to be travelled by the HEV, route information of the HEV, historical data associated with speed of the HEV, condition of the power source of the HEV, Air Conditioner (AC) consumption, HEV parameters and road parameters.

8. The method as claimed in claim 1, wherein determining the start-up time of the engine comprises:
determining electric range of the vehicle at each of the plurality of first predefined time intervals for a predefined time frame based on one or more parameters comprising SOC of the power source, ambient temperature of the engine, Air Conditioner (AC) state of the vehicle, temperature of the vehicle, average speed information of the vehicle;
determining current speed of the vehicle;
calculating total distance to be travelled by the vehicle based on the determined speed; and
determining the start-up time of the engine based on the electric range of the vehicle, total distance to be travelled by the vehicle, and the current speed of the vehicle.

9. A control unit for controlling a pre-warming process of an engine of a Hybrid Electric Vehicle (REV), the control unit comprising:
a processor; and
a memory communicatively coupled to the processor, wherein the memory stores the processor-executable instructions, which, on execution, causes the processor to:
initiate the pre-warming process of the engine at a first time;
determine a start-up time of the engine based on at least one of State of Charge (SOC) of a power source, energy consumption by a drive motor of the HEV, energy discharged by the power source, electric range of the vehicle and speed of the vehicle obtained over a plurality of first predefined time intervals, wherein the start-up time of the engine is determined at a second time, wherein
to determine the start-up time of the engine the instructions causes the processor to
determine the SOC of the power source at each of the plurality of first predefined time intervals for a predefined time frame,
identify a slope value of the SOC at each of the plurality of first predefined time intervals,
identify a plurality of SOC slope samples with negative slope value and zero slope value from the slope value of the SOC at each of the plurality of first predefined time intervals,
identify a minimum SOC slope and an average SOC slope from the plurality of SOC slope samples, wherein the minimum SOC slope is the SOC slope sample with minimum value among the plurality of SOC slope samples and average SOC slope is based on average value of the plurality of SOC slope samples, calculate a weighted average of the minimum SOC slope and the average SOC slope based on the minimum SOC slope, the average SOC slope and a predefined weightage value associated with the minimum SOC slope and the average SOC slope respectively, and determine the start-up time of the engine based on the weighted average of the minimum SOC slope and the average SOC slope, a current value of SOC of the power source and a minimum value of SOC of the power source among the SOC of the power source at each of the plurality of first predefined time intervals in the predefined time frame;

determine an engine heating time for the engine based on one or more predefined parameters;

discontinue the pre-warming process of the engine at a third time when the determined start-up time of the engine is greater than the engine heating time;

restart the pre-warming process of the engine at a fourth time when the determined start-up time of the engine is less than the engine heating time and when the pre-warming process of the engine is discontinued; and perform a process of determining the start-up time of the engine, determining the engine heating time, discontinuing the pre-warming process and restarting the pre-warming process over second predefined time intervals thereby controlling the pre-warming process of an engine.

10. The control unit as claimed in claim 9, wherein the pre-warming process of the engine is initiated prior to the start-up time of the engine.

11. The control unit as claimed in claim 9, wherein the one or more parameters comprises ambient temperature, temperature of the power source, temperature of an engine coolant, temperature of a power source coolant and flow rate of the coolant.

12. The control unit as claimed in claim 9, wherein the second time is later than the first time.

13. The control unit as claimed in claim 9, wherein the processor initiates pre-warming process of the engine when the start-up time of the engine is less than the engine heating time.

14. The control unit as claimed in claim 9, wherein to determine the start-up time of the engine, the instructions causes the processor to:

determine a speed of the vehicle at each of the plurality of first predefined time intervals for a predefined time frame;

determine a current value and power value of a motor configured to generate driving power for the vehicle based on the speed of the vehicle;

determine SOC of the power source based on the current value and power value of the motor; and determine the start-up time of the engine based on at least one of slope value of the SOC at each of the plurality of first predefined time intervals and a future time at which the SOC of the power source reaches a predefined threshold value.

15. The control unit as claimed in claim 14, wherein the speed of the HEV is determined based on one or more parameters, in the predefined time frame, comprising traffic condition in a route to be travelled by the HEV, route information of the HEV, historical data associated with speed of the HEV, condition of the power source of the HEV, Air Conditioner (AC) consumption, HEV parameters and road parameters.

16. The control unit as claimed in claim 9 is associated with one or more heat sources for initiating the pre-warming process of the engine, discontinuing the pre-warming process of the engine and re-starting the pre-warming process of the engine.

17. The control unit as claimed in claim 9, wherein to determine the start-up time of the engine, the instructions causes the processor to:

determine electric range of the vehicle based on one or more parameters comprising SOC of the power source, ambient temperature of the engine 205, Air Conditioner (AC) state of the vehicle, temperature of the vehicle, average speed information of the vehicle;

determine a current speed of the vehicle;

calculate a total distance to be travelled by the vehicle from the measured speed; and determine the start-up time of the engine based on the range of the electric vehicle, total distance travelled by the electric vehicle, and the current speed of the vehicle.

18. A control unit for controlling a pre-warming process of an engine of a Hybrid Electric Vehicle (HEV), the control unit comprising:

a processor; and a memory communicatively coupled to the processor, wherein the memory stores the processor-executable instructions, which, on execution, causes the processor to:

initiate the pre-warming process of the engine at a first time;

determine a start-up time of the engine based on at least one of State of Charge (SOC) of a power source, energy consumption by a drive motor of the HEV, energy discharged by the power source, electric range of the vehicle and speed of the vehicle obtained at each of a plurality of first predefined time intervals, wherein the start-up time of the engine is determined at a second time, wherein the method to determine the start-up time of the engine comprises determining the SOC of the power source at each of the plurality of first predefined time intervals for a predefined time frame, identifying a slope value of the SOC at each of the plurality of first predefined time intervals, identifying a plurality of SOC slope samples with negative slope value and zero slope value from the slope value of the SOC at each of the plurality of first predefined time intervals, identifying a minimum SOC slope and an average SOC slope from the plurality of SOC slope samples, wherein the minimum SOC slope is the SOC slope sample with minimum value among the plurality of SOC slope samples and average SOC slope is based on average value of the plurality of SOC slope samples, calculating a weighted average of the minimum SOC slope and the average SOC slope based on the minimum SOC slope, the average SOC slope and a predefined weightage value associated with the minimum SOC slope and the average SOC slope respectively, and determining the start-up time of the engine based on the weighted average of the minimum SOC slope and the average SOC slope, a current value of SOC of the power source and a minimum value of SOC of the power source among the SOC of the power source at each of the plurality of first predefined time intervals in the predefined time frame;

determine an engine heating time for the engine based on one or more predefined parameters; and perform a process of determining the start-up time of the engine and determining the engine heating time over a plurality of second predefined time intervals thereby controlling the pre-warming process of an engine.

19. The control unit as claimed in claim 18, wherein the processor determines the start-up time of the engine by:

calculating a change in quantity of at least one of State of Charge (SOC) of a power source, energy consumption by a drive motor of the HEV, energy discharged by the power source, electric range of the vehicle and speed of the vehicle obtained at each of the plurality of first predefined time intervals; and determining the start-up time of the engine based on the change in quantity at each of a plurality of the first predefined time intervals.

20. The control unit as claimed in claim 18, wherein the processor is further configured to:

discontinue the pre-warming process of the engine at a third time when the determined start-up time of the engine is greater than the engine heating time;

restart the pre-warming process of the engine at a fourth time when the determined start-up time of the engine is less than the engine heating time and when the pre-warming process of the engine is discontinued; and perform the process of determining the start-up time of the engine and determining the engine heating time, discontinuing the pre-warming process and restarting the pre-warming process over a plurality of second predefined time intervals thereby controlling the pre-warming process of the engine.

* * * * *